Feb. 11, 1969　　　　　L. LOUIS　　　　　3,427,519
SYSTEM FOR AUTOMATIC CONTROL OF MOVEMENT OF A MOVABLE STRUCTURE
THROUGH A PRESELECTED LENGTH OF ITS DISPLACEMENT PATH
Filed March 11, 1965
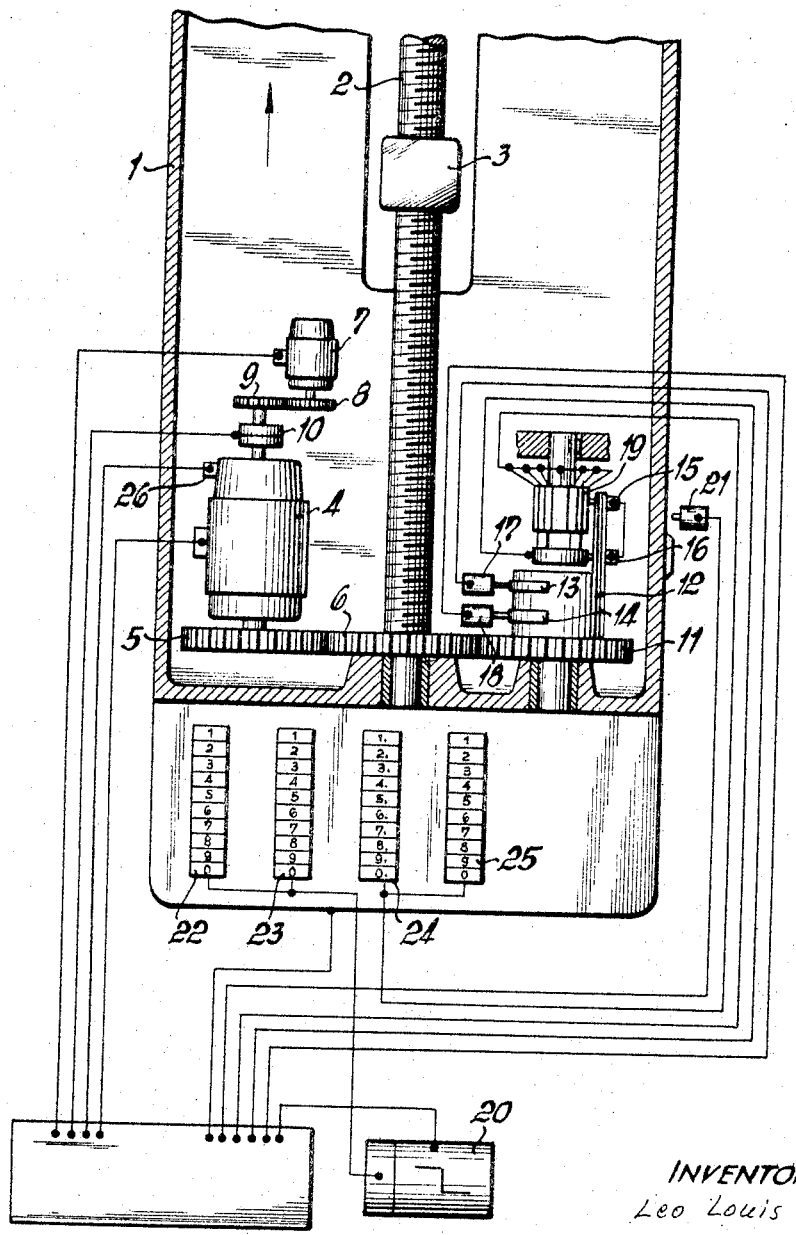
INVENTOR
Leo Louis
by
Michael S. Striker

United States Patent Office 3,427,519
Patented Feb. 11, 1969

3,427,519
SYSTEM FOR AUTOMATIC CONTROL OF MOVEMENT OF A MOVABLE STRUCTURE THROUGH A PRESELECTED LENGTH OF ITS DISPLACEMENT PATH
Leo Louis, Alt-Myhl, Germany, assignor to Wilhelm Hegenscheidt Kommanditgesellschaft, Erkelenz, Rhineland, Germany
Filed Mar. 11, 1965, Ser. No. 439,032
Claims priority, application Germany, Mar. 13, 1964, H 52,042
U.S. Cl. 318—18         8 Claims
Int. Cl. G05b 13/02, 11/01; H02p 5/46, 7/68, 7/74

ABSTRACT OF THE DISCLOSURE

A system for automatic control of movement of a movable structure, such as a carriage for a machine tool or the like, through a preselected length of its displacement path, and including a first preselector for preselecting a number of units of a first scale of units, a second preselector for selecting a number of units of a second scale of units smaller in value than said first scale of units, and means cooperating with the first and the second preselector and with drive means connected to the structure to move the latter first through a length of the path corresponding to the preselected number of units of the first scale, then through a length corresponding to the preselected number of the second scale and for thereafter stopping the drive means.

---

This invention relates to apparatus for automatically controlling the movement of a machine tool carriage, and more particularly to a device for automatically controlling the cross-slide of a machine tool carriage, after selection of its displacement path, by means of a motor-driven screw-threaded spindle, a rotatable pulse generator whose generated pulses act on a decade counter, and rotating contacts whose positions terminate the movement of the tool carriage after a preselected feed movement.

Devices for the exact adjustment of a tool carriage or the like on machine tools by means of a stop which limits the movement of the carriage and in which the stop is adjusted by means of a motor-controlled threaded spindle are already known. In these known devices, the displacement is adjusted in a preselector which is connected electrically to a switch mechanism and which consists of individual selector devices which, for each number, are provided with a number of contacts on each of which a motor-driven sliding contact is adapted to slide. The selector devices are also provided with contactors which are separated by the rotating switch contacts. Each selector device of the counter and switch mechanism corresponds in the preselector to a selector switch with the same number of contacts as the corresponding selector device, whereby each individual contact of a selector device is connected electrically to one contact of the corresponding selector switch. Upon closing the circuit, and as a result of the contacts rotating in the selector devices sliding over the contacts preselected in the preselector (first of all, the selector device for the number of largest size, finally the selector device for the number of smallest size), the exact rotation of the displacement spindle is determined, with the result that the speed of rotation of the threaded spindle is decreased by means of a relay arrangement when the adjusted machine part approaches the preselected point, and finally is stopped, whereupon the spindle is returned automatically to the zero position according to a further adjustment, and is then switched off.

Devices for controlling movement according to a preselected length of path are also known in which the driving member supplies regular pulses to step selectors which are reversed from the chosen position to the initial position and there end their movement; in which several sequential pulse generators are provided at the input with associated step selectors; and in which each step selector receives per decade sub-divided unit range a number of pulses which corresponds to its path length, so that each group of pulse counters and associated step selectors is associated with a particular speed of the moving member, the change in speed following simultaneously with the reversal of one of the next groups.

Feed devices with decade selector devices are also already known in which the displacement path is sensed by rotating rollers and in which the number of revolutions of these sensing rollers is divided in a decade manner and is indicated in some suitable manner. With such a device, the instantaneous position of the tool slide can be read off, but the device does not permit the desired position to be preselected and this therefore has to be determined beforehand.

The above-mentioned known devices for automatic adjustment of a machine part are used, for example, on coordinate tables of jig drills in which the adjustment of the tool slide must be made to hundred of a millimetre or a fraction thereof. This high precision presupposes a very finely adjustable device and a device capable of high precision working.

In jig drills the tool slide should however also be guided from one position to the next. This requires that, for example, a step switch mechanism controls forward and reverse movement or that the positioning of the limit stop is always taken from the zero position. It also assumes that the stop is always guided automatically into the zero position after the tool slide has been brought into position, so that for the new position of the tool slide the stop is positioned from the zero position, while the tool slide always moves only towards the stop. However, such a device makes accurate positioning extremely complicated.

Numerous cases have arisen and still arise in the machine tool art in which the adjustment of a machine part need not be made with such a high precision; in which, on the contrary, a precision which is accurate to one or two decimal places is sufficient. In such cases, the tool slide need not be adjusted to a hundredth or thousandth part of a millimetre but to the nearest millimetre or tenth of a millimetre. In these cases, it is sufficient if the tool slide is moved for each adjustment of the diameter of cut from the initial position to its working position.

In planing lathes, for example, which are rotated with a very large depth of cut, a precision of several tenths of a millimetre is sufficient for the bringing of the tool slide into position. In all these cases, automatic adjustment is important since it makes re-measurement superfluous and thus shortens the secondary or wasted time. This is also applicable to the machining of larger diameters on turning lathes in which, in a similar manner, the workpiece does not need to be machined with the highest precision, and in which re-measurement of the workpiece after positioning of the turning tool is troublesome and extremely time-consuming. For such machining operations the known devices are not suitable since they are too expensive and generally too complex.

The present invention overcomes these disadvantages by providing an arrangement for exact adjustment of the rotation diameter on a turning lathe, in which the adjustment is effected automatically and accurately after preselection of the desired rotation diameter. With such a device, which is principally used for heavy production turning lathes, a shortening of the second time after the adjustment of the machine is achieved, and a robust, trouble-free working construction is ensured. For this purpose, the tool slide is displaced directly, and not by a stop, in a known manner by means of a conveyor spindle whose end position is predetermined by a preselected step switch mechanism and a slip-ring commutator. This arrangement is simple and permits robust operation of a heavy production turning lathe. The tool carriage or slide moves at high speed towards the preselected end position which corresponds to the desired rotation diameter, but remains several millimetres from the final position and moves over the latter short distance in a slow speed traverse into its working position, from which it can be returned again in a high-speed traverse.

In accordance with the present invention, the threaded spindle is provided with a rotatable contact for the measurement of centimetres. This contact is energised at a certain position of the tool carriage corresponding to the initial count state and, in a known manner, transmits current pulses to a counter provided with a preselector. The spindle is also provided with a second rotatable contact for the measurement of millimetres and tenths of a millimetre; this second contact slides on a slip-ring commutator whose segments are connected to a second preselector.

This arrangement has the advantage that only one individual pulse generator is used for the whole range of displacement, namely only for the coarse, centrimetre adjustment. Thus, only a few pulses are necessary for a large displacement path, so that only a simple counter capable of low counting speeds is necessary. Because of the small number of pulses the pulse generator can be a simple mechanical cam switch.

In accordance with the present invention, one complete rotation of the contact, which is not relevant to the count and which is compensated by advancing the initial count state by one unit, is provided between the end of the centimetre count and the beginning of the count for millimetres and tenths of a millimetre. This rotation which is not relevant to the count and which separates the two count systems is necessary for accurate switching and counting.

Above all, after the end of this rotation and before the counting of the millimetres and tenths of a millimetre begins, the switching and counting system is connected to a current supply. Thus, the running-on of the carriage and its drive caused by the inertial forces is rendered ineffective. The threaded spindle is driven in a known manner by a high-speed and a slow-motion motor, the high-speed motor being so adjusted that its running-on ensures running-on of the rotating contacts through less than 360°. After the running-on of the carriage and its drive from the high-speed motor, the slow-motion motor moves the rotatable contacts into the switch position. Then, the contact for the slip-ring commutator is energized, and thereafter it leaves the segments in a position corresponding to 0.0, but before it has reached the segments corresponding to the position 9.5. This requirement makes it possible for the insulation between the switch segments in the slip-ring commutator to be greater than the slip-ring contacts.

It will be obvious that this device can be so manufactured that the coarse adjustment counts in minnimetres and that the fine adjustment is taken from a hundred-part commutator, so that the accuracy of the positioning can thus be increased.

In order that the invention may be more readily understood one embodiment thereof will now be described in detail by way of example and with reference to the accompanying drawing which shows this embodiment in a diagrammatic form.

As shown in the drawing:

A tool slide or tool carriage indicated at 1 is arranged to move in the direction of the arrow in tool carriage guides (not shown) on a bed plate by means of a screw-threaded spindle 2 having an associated nut 3 which is secured to the bed plate. When the carriage moves in the direction of the arrow its traverse means that a tool secured to the carriage will cut along a decreasing length diameter. The drive for the threaded spindle 2 is obtained either from a motor 4 whose output shaft is coupled to the spindle through two meshing wheels 5 and 6, or from a second motor 7 whose output shaft is coupled through two meshing gear wheels 8 and 9 to the input side of the first motor 4 and hence to the spindle 2. The two motors 4 and 7 drive their respective shafts and can be coupled to one another or disconnected from one another by means of a magnetic clutch 10 which is arranged on the input side of the shaft of the first motor 4. The first motor 4 acts as a high-speed motor and the second motor 7 acts as a slow-motion motor.

Gear wheel 6 which is aligned with the spindle axis is also arranged to mesh with a further gear wheel 11 on which is mounted a rotatable plate 12 having a rectangular portion arranged edgewise on the gear wheel 11 and having a narrow extension finger extending upwardly at one outer edge thereof.

On the side of the plate 12 remote from the extension finger two spaced stops 13 and 14 are provided, and on the outer edge of the extension finger itself two terminals 15 and 16 are attached. The stops 13, 14 act on switches 17 and 18 respectively and the two terminals 15, 16 are connected to a commutator 19. The stop 13 is adapted to contact switch 17 which is electrically connected to a step-by-step switch 20. If the threaded spindle 2 has a pitch of 10 millimetres and the gear wheels 6 and 11 have a transmission ratio of 1:2, then one revolution of the plate 12 corresponds to a 5 millimetre movement of the tool carriage 1. The number of revolutions of the plate 12 is counted and the count begins from a valve corresponding to a predetermined outermost carriage position when a limit switch 21 makes contact with a projection on the tool carriage and has thus energized the switch 17. The counting is carried out backwards from a large valve diameter i.e.; a position in which the tool cuts a large diameter circular path around a rotating object.

A key-operated control panel arranged on a decade basis with rows of keys or buttons 22–25 is disposed on the tool carriage 1. The desired diameter of cut of the tool can be preselected and indicated by pressing the corresponding keys in the particular rows. The rows 22 and 23 are provided for the centimetre range and are connected to the step-by-step switch 20. The rows 24 and 25 are provided for the millimetre and tenths of a millimetre ranges respectively and are connected to the slip-ring commutator 19.

Upon selecting one or more of the keys in the centimetre rows 22, 23 one particular contact of the step-by-step switch 20 is energized, and by the selection of one or more of the keys in the millimetre and tenths of a millimetre rows 24, 25, one particular segment of the commutator 19 is connected to a terminal.

The counting of the number of complete revolutions of the plate 12 and hence of the spindle 2, and also of the whole number of centimetres traversed by the tool carriage, is continued until such time as the centimetre value preselected on the control panel rows 22 and 23 has reached the energized contact in the step-by-step switch 20, whereupon the high-speed rotor 4 is switched off. The running-on of the motor 4 is so selected that it is safely less than corresponds to one complete revolution of the plate 12. The stops 13 and 14 are therefore arrested before they again strike the switches 17 and 18. When the high-speed motor 4 comes to rest the slow-motion motor 7 is switched on so that the stops 13 and 14 are arranged to approach the switches 17 and 18 slowly. Not until the stop 14 completes the full revolution, but before it has reached the next position corresponding to the smallest switch step, is the switch 18 energized so as then to make the preselected segment of the slip-ring commutator 19 conductive. Upon reaching the now conducting segment of the commutator, the slow-motion motor 7 is also disconnected and a brake 27 is applied. The tool carriage then comes to rest with the tool set for the preselected diameter.

While I have herein shown and described one embodiment of my invention, it should be understood that I do not desire the invention to be limited to the specific form shown, but that various other variations and modifications in the invention may be attained without departing from the spirit and scope of the novel concepts thereof, as defined by the appended claims.

I claim:

1. In a system for automatic control of movement of a movable structure through a preselected length of its displacement path, drive means coupled to said movable structure for effecting movement thereof along said path; first contact means coupled to said drive means for generating, when energized and during operation of said drive means, count pulses corresponding to a first scale of units of movement of the structure; means for energizing said first contact means at a predetermined position of the structure corresponding to an initial count state; a counter provided with a first preselector for preselecting a number of units of said first scale of units, said counter being arranged to receive said count pulses and being connected to said drive means to maintain the same in operation until the number of count pulses produced by said first contact means corresponds to said preselected number of units of said first scale of units so as to move said structure through a distance corresponding to said preselected number of said first scale of units; and means for further operating said drive means so as to move said structure through a second distance corresponding to a preselected number of units of a second scale of units smaller in value than said units of said first scale, and for stopping said structure after it has moved through said second distance, said last-mentioned means comprising commutator means having a plurality of segments, second contact means coupled to said drive means to be moved over said commutator means in contact therewith, and a second preselector for selecting a number of units of said second scale of units and connected to said segments to energize a segment corresponding to a selected number of units of said second scale, said second contact means cooperating with said drive means to stop said latter when said second contact means contacts said energized segment.

2. In a system as defined in claim 1, in which said drive means comprises motor means and a spindle driven by said motor means and connected to said structure for effecting movement thereof along said path.

3. In a system as defined in claim 1, wherein said structure is a carriage of a machine tool.

4. In a system as defined in claim 1, wherein said first and said second contact means each include a rotatable contact member coupled to said spindle to be rotated thereby.

5. In a system as defined in claim 4, and including means in circuit with said second preselector and said segments and cooperating with said rotatable member of said first contact means to cause energizing of said one segment at the end of said first scale count only after said rotatable member of said first contact means has made a full revolution.

6. In a system as defined in claim 4, wherein said motor means include a high-speed motor and a low-speed motor, said counter cooperating with said high-speed motor to de-energize the latter at the end of said first scale count and said high-speed motor having an inertia so that its running-on period will cause said first and said second contact members to turn through less than 360°.

7. In a system as defined in claim 5, wherein said motor means include a high-speed motor and a low-speed motor, said counter cooperating with said high-speed motor to de-energize the latter at the end of said first scale count and said high-speed motor having an inertia so that its running-on period will cause said first and said second contact members to turn through less than 360°.

8. In a system as defined in claim 1, wherein the insulations between said commutator segments have a width greater than a contact portion of said second contact means which contacts said commutator means.

References Cited

UNITED STATES PATENTS

| | | | |
|---|---|---|---|
| 2,760,138 | 8/1956 | Colby | 318—467 |
| 3,209,221 | 9/1965 | Pugsley et al. | |
| 3,323,030 | 5/1967 | Inaba et al. | 318—18 |

BENJAMIN DOBECK, *Primary Examiner.*

U.S. Cl. X.R.

318—28